United States Patent
Hirabayashi

(10) Patent No.: US 10,177,623 B2
(45) Date of Patent: Jan. 8, 2019

(54) DC MOTOR

(71) Applicant: DENSO CORPORATION, Kariya, Aichi-pref. (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 390 days.

(21) Appl. No.: 15/062,464

(22) Filed: Mar. 7, 2016

(65) Prior Publication Data

US 2016/0268865 A1 Sep. 15, 2016

(30) Foreign Application Priority Data

Mar. 13, 2015 (JP) .................................. 2015-050500

(51) Int. Cl.
  *H02K 5/14* (2006.01)
  *H01R 39/38* (2006.01)

(52) U.S. Cl.
  CPC ........... *H02K 5/148* (2013.01); *H01R 39/385* (2013.01)

(58) Field of Classification Search
  CPC ....... H02K 5/148; H01R 39/385; H01R 39/38
  See application file for complete search history.

(56) References Cited

U.S. PATENT DOCUMENTS

| | | | | |
|---|---|---|---|---|
| 7,256,527 | B2* | 8/2007 | Niimi | H01R 39/385 310/239 |
| 8,427,027 | B2* | 4/2013 | Grabner | H01R 39/383 310/239 |
| 9,985,401 | B2* | 5/2018 | Hirabayashi | H01R 39/381 |
| 2008/0083556 | A1 | 4/2008 | Sumcad et al. | |
| 2011/0025063 | A1 | 2/2011 | Faber et al. | |
| 2011/0187225 | A1 | 8/2011 | Bayer et al. | |

FOREIGN PATENT DOCUMENTS

| | | |
|---|---|---|
| JP | H10-243592 A | 9/1998 |
| KR | 2013-0007793 A | 1/2013 |

* cited by examiner

*Primary Examiner* — Dang Le
(74) *Attorney, Agent, or Firm* — Oliff PLC

(57) ABSTRACT

A first brush holder is assembled to a core-side connection plate by inserting a slit insertion portion into a slit from an outer circumferential side of the core-side connection plate, and a radial outside position of the first brush holder to the core-side connection plate is regulated by both sides in a circumferential direction of a first slit being inserted into a pair of guiding grooves. A radial outside position of the brush holder is regulated by being fixed to a counter-core-side connection plate by press-fitting a convex portion provided on a counter-core-side of the first brush holder into a second slit of a counter-core-side connection plate. A second brush holder is assembled to the counter-core-side connection plate from an outer circumferential side of the counter-core-side connection plate, and a radial outside position is regulated by the core-side connection plate.

17 Claims, 12 Drawing Sheets

BRUSH ASSY

FIG.3
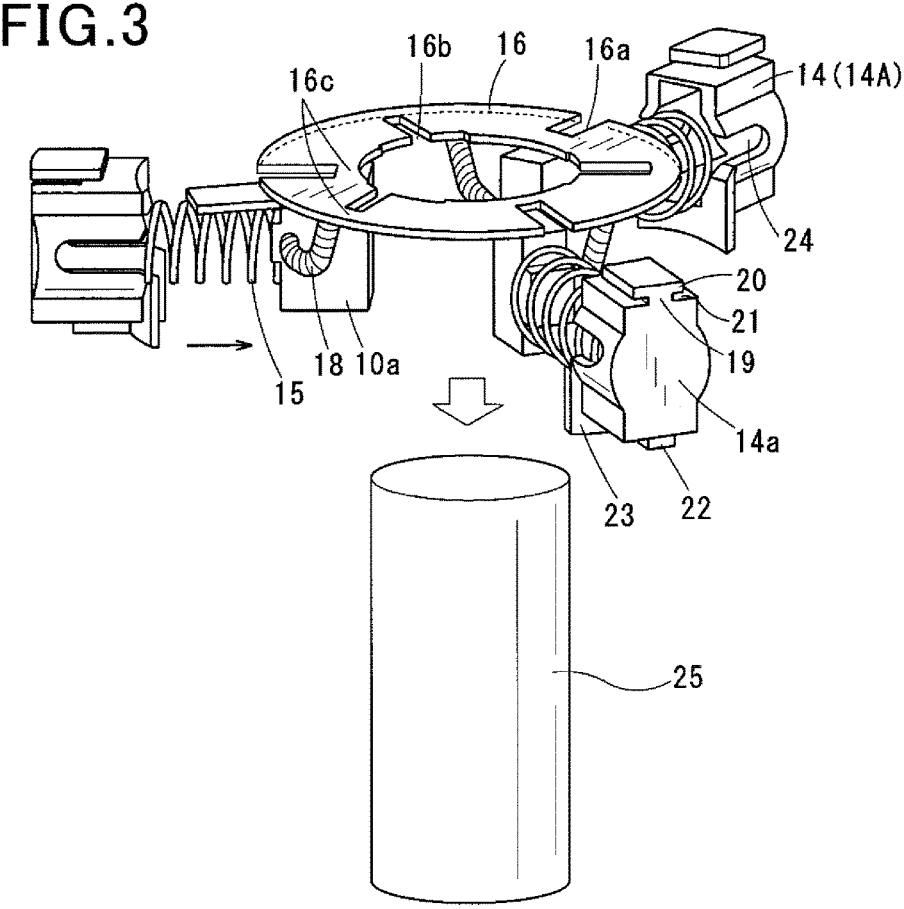
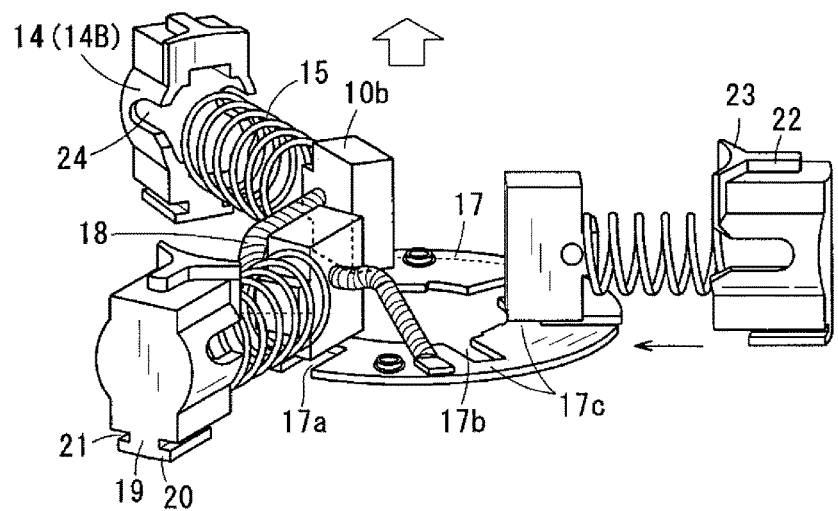

BRUSH ASSY

DC MOTOR

CROSS-REFERENCE TO RELATED APPLICATION

This application is based on and claims the benefit of priority from earlier Japanese Patent Application No. 2015-50500 filed Mar. 13, 2015, the description of which is incorporated herein by reference.

TECHNICAL FIELD

The present disclosure relates to a DC motor that disposes brushes held in a box-shaped brush holder on an outer periphery of a cylindrical commutator.

BACKGROUND

As conventional technology, there is a brush ASSY (assembly) applied to a six-pole magnet type DC motor disclosed in Korean Patent Application KR 2013-0007793.

The brush ASSY is provided with brushes (three positive brushes and three negative brushes, for example) disposed on an outer periphery of a cylindrical commutator, and a box-shaped brush holder that holds the brushes.

The brush ASSY is further provided with brush springs accommodated inside the brush holder to press the brushes to the commutator, positive connection plates for electrically connecting between the positive brushes, and negative connection plates for electrically connecting between the negative brushes.

The brush holder is disposed between the positive connection plates and the negative connection plates, and is assembled to both the connection plates from an inner circumferential side in a radial direction.

Methods of assembling the brush ASSY according to the conventional technology (KR 2013-0007793) are considered to be in the following two patterns.

1) In a state where the positive connection plates, all of the brush holders, and the negative connection plates are assembled, the brush springs and the brushes are inserted into the brush holder in this order from inside in a radial direction thereof.

Thereafter, a jig is inserted into a central portion of the brush holder so that the brushes do not drop out toward the inner circumferential side.

2) In a state where the positive connection plates and all of the brush holders are assembled, the brush springs and the brushes are inserted into the brush holder in this order from inside in a radial direction thereof.

Thereafter, in a state where a jig is inserted into a central portion of the brush holder so that the brushes do not drop out toward the inner circumferential side, all of the brush holders are fixed to the negative connection plates.

Since the brushes are inserted into the brush holder in a state of where at least all of the brush holders are assembled to the positive connection plates in the above assembling method, it is impossible to insert all the brushes to each brush holder from the inside in the radial direction simultaneously.

Moreover, when inserting all of the brushes into the brush holders one by one, it is necessary to press the brushes that have been inserted into the brush holders so that the brushes do not drop out toward the inner circumferential side.

Therefore, in the configuration of KR 2013-0007793, since assemblability of the brush ASSY is poor and assembling work takes time, there is a problem that the productivity is low.

SUMMARY

An embodiment provides a DC motor where it is easy to assemble a brush assembly, and is capable of improving productivity.

A DC motor having four or more poles in a first aspect includes a cylindrical commutator composed on an axis of an armature, brushes composed of positive brushes and negative brushes disposed on an outer periphery of the commutator, brush holders that hold the brushes, brush pressing members accommodated in the brush holders that press the brushes toward the commutator, an electrically conductive first connection plate to which all the positive brushes or all the negative brushes are electrically connected individually via pigtails, and an electrically conductive second connection plate to which all the negative brushes or all the positive brushes are electrically connected individually via the pigtails.

The brush holder of which an inner circumferential side in a radial direction facing the commutator is opened and the brush holder includes a wall on an outer circumferential side in the radial direction thereof that regulates an outside position in the radial direction of the brush pressing member, an armature core side in an axial direction of the brush holder, which is referred to as a core side, is assembled to the first connection plate, and a counter-armature core side in the axial direction of the brush holder, which is referred to as a counter-core-side, is assembled to the second connection plate.

When referring to the brush holder that holds the brush connected to the first connection plate via a pigtail as a first brush holder, and the brush holder that holds the brush connected to the second connection plate via the pigtail as a second brush holder, a slit that opens outside in the radial direction and extends halfway to inside is formed in the first connection plate at a circumferential position where the first brush holder is disposed, and the first brush holder has a slit insertion portion on the core side in the axial direction, the first brush holder is assembled to the first connection plate by inserting the slit insertion portion into the slit from an outer circumferential side of the first connection plate, and an outside position in the radial direction of the first brush holder with respect to the first connection plate is regulated by a single first regulating member.

According to the above configuration, since it is possible to assemble the first brush holder from the outer circumferential side of the first connection plate, assemblability can be improved as compared with the conventional technology of assembling the first brush holder from the inner circumferential side of the first connection plate.

For example, by disposing a jig that regulates an inside position of the brush in a radial direction at a central position in the radial direction of the first connection plate, and by assembling the first brush holder from the outer circumferential side of the first connection plates, the brush never drops out to inside in the radial direction pushed by the pressing member, therefore assemblability of the first brush holder improves.

Further, it is possible to assemble a plurality of the first brush holders at the same time to the first connection plate.

That is, since the first brush holders are assembled from the outer circumferential side of the first connection plates, the first brush holders will not interfere with each other, and by assembling the plurality of the first brush holders at the same time, the assembling process can be shortened.

A DC motor having four or more poles in a second aspect includes a cylindrical commutator composed on an axis of an armature, brushes composed of positive brushes and negative brushes disposed on an outer periphery of the commutator, brush holders that hold the brushes, brush pressing members accommodated in the brush holders that press the brushes toward the commutator, an electrically conductive first connection plate to which all the positive brushes or all the negative brushes are electrically connected individually via pigtails, and an electrically conductive second connection plate to which all the negative brushes or all the positive brushes are electrically connected individually via the pigtails.

The brush holder of which an inner circumferential side in a radial direction facing the commutator is opened and the brush holder includes a wall on an outer circumferential side in the radial direction thereof that regulates an outside position in the radial direction of the brush pressing member, an armature core side in an axial direction of the brush holder, which is referred to as a core side, is assembled to the first connection plate, and a counter-armature core side in the axial direction of the brush holder, which is referred to as a counter-core-side, is assembled to the second connection plate.

When referring to the brush holder that holds the brush connected to the first connection plate via a pigtail as a first brush holder, and the brush holder that holds the brush connected to the second connection plate via the pigtail as a second brush holder, a slit that opens outside in the radial direction and extends to a radially middle position is formed in the first connection plate at a circumferential position where the first brush holder is disposed, and a bridge portion that crosses at least a part of the slit in a circumferential direction is disposed on a core side in a thickness direction of the first connection plate to connect both sides of the slit, and the first brush holder has a slit insertion portion on the core side in the axial direction, the first brush holder is assembled to the first connection plate by inserting the slit insertion portion into the slit from an outer circumferential side of the first connection plate via inside the bridge portion, and an outside position in the radial direction of the first brush holder with respect to the first connection plate is regulated by a single first regulating member.

According to the above configuration, since it is possible to assemble the first brush holder from the outer circumferential side of the first connection plate, assemblability can be improved as compared with the conventional technology of assembling the first brush holder from the inner circumferential side of the first connection plate.

For example, by disposing a jig that regulates an inside position in a radial direction of the brush at a central position in the radial direction of the first connection plate, and by assembling the first brush holder from the outer circumferential side of the first connection plates, the brush never drops out to inside in the radial direction pushed by the pressing member, therefore assemblability of the first brush holder improves.

Note that since the slit insertion portion is inserted into the slit through inside the bridge portion when assembling the first brush holder to the first connection plate, the slit insertion portion will not interfere with the bridge portion.

Further, it is possible to assemble a plurality of the first brush holders at the same time to the first connection plate.

That is, since the first brush holders are assembled from the outer circumferential side of the first connection plates, the first brush holders will not interfere with each other, and by assembling the plurality of the first brush holders at the same time, the assembling process can be shortened.

BRIEF DESCRIPTION OF THE DRAWINGS

In the accompanying drawings:

FIG. 3 shows a perspective view of a core-side sub ASSY and a counter-core-side sub ASSY in a state before assembling according to the first embodiment;

DETAILED DESCRIPTION OF THE PREFERRED EMBODIMENTS

Modes for carrying out the present disclosure will be described in more detail by the following embodiments.
[Embodiments]
[First Embodiment]

In a first embodiment, a case of using a DC motor of the present disclosure to a starter for starting an engine will be described.

Figure 4:
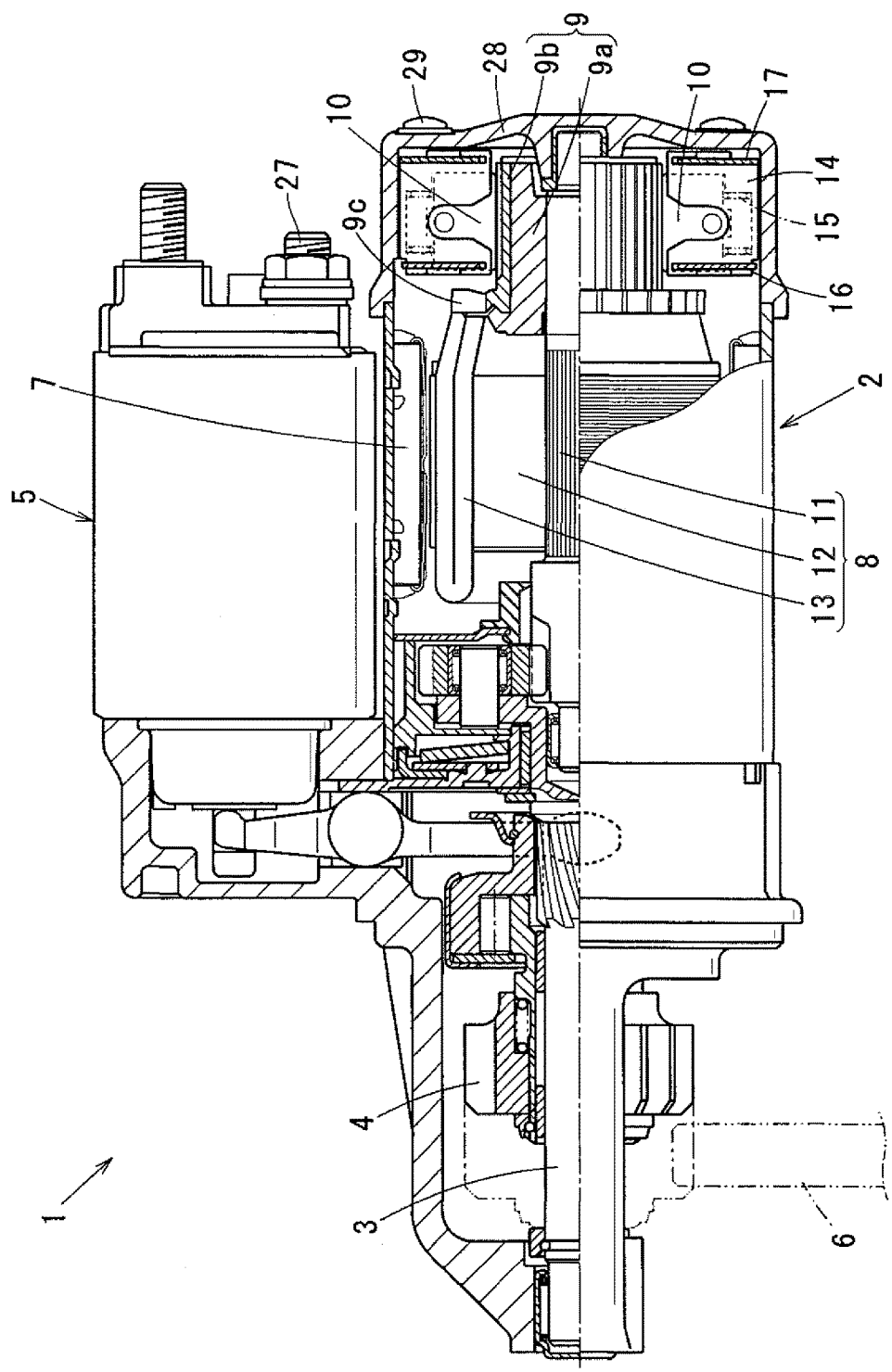
FIG. 4 shows a partially sectional overall view of a starter according to the first embodiment.

As shown in FIG. 4, a starter 1 has a pinion 4 disposed on an output shaft 3 that is driven and rotated by a motor 2.

The starter 1 employs a system that engages the pinion 4 with a ring gear 6 of an engine (not shown) by pushing out the pinion 4 in a counter-motor direction of the output shaft 3 (to the left in FIG. 4) using an attraction force of an electromagnetic switch 5 that integrates a solenoid therein (generally called a pinion-plunging type).

It should be noted that since the basic structure and operation of the starter 1 are well known, detailed description is omitted, and the motor 2 in detail according to the present disclosure will be described below.

The motor 2 is a DC motor of four or more poles (e.g. 6 poles) that uses a permanent magnet 7 for a field pole, and includes an armature 8, a cylindrical commutator 9, brushes 10, and the like. The armature 8 is disposed on an inner periphery of the field pole with an air gap therebetween. The commutator 9 is composed on an axis of the armature 8. The brushes 10 are disposed on an outer periphery of the commutator 9.

The commutator 9 includes a cylindrical insulator base 9a made of a resin material, for example, and a plurality of commutator segments 9b disposed in a cylindrical shape and held by the insulator base 9a.

Then, the insulator base 9a is fixed by press-fitting to an outer circumference of one end of an armature shaft 11.

Each of the commutator segments 9b is insulated from each other by the insulator base 9a, and an armature coil 13 is connected to a riser 9c provided on each commutator segments 9b in an armature core 12 side in an axial direction (left side in FIG. 4).

The brushes 10 include three positive brushes 10a and three negative brushes 10b disposed alternately in a circumferential direction of the commutator 9, and constitute a brush ASSY (assembly) shown in FIG. 1 together with brush holders 14, brush pressing members 15, and a pair of connection plates 16, 17 described below.

Each of the brush holders 14 is formed of insulating member such as a resin or the like, and as shown in FIG. 3, an inner circumferential side of the brush holder 14 in a radial direction is opened to form a box-shape having a wall 14a on an outer circumferential side in the radial direction.

The brush pressing member 15 is a coil spring, for example, and is accommodated in the brush holder 14. A position of the brush pressing member 15 outside in the radial direction is regulated by the wall 14a of the brush holder 14, and presses the brush 10 toward the commutator 9.

Both of the pair of connection plates 16, 17 are made of metal, and each has a ring-shape that has a round hole having a larger diameter than an outer diameter of the commutator 9 opened in a central portion in the radial direction of the connection plates 16, 17.

The pair of connection plates 16 and 17 include a core-side connection plate 16 (corresponds to a first connection plate in the present disclosure) disposed on a core side in an axial direction, and a counter-core-side connection plate 17 (corresponds to a second connection plates of the present disclosure) disposed on a counter-core side in the axial direction.

Incidentally, the core side in the axial direction refers to a side close to the armature core 12 (left side in FIG. 4), and the counter-core-side in the axial direction refers to a side far from the armature core 12 (right side in FIG. 4).

As shown in FIG. 3, the three positive brushes 10a are respectively connected electrically to a counter-core-side surface of the core-side connection plate 16 facing the counter-core-side connection plate 17 in the axial direction through pigtails 18.

On the other hand, the three negative brushes 10b are respectively connected electrically to a core-side surface of the counter-core-side connection plate 17 facing the core-side connection plate 16 in the axial direction through the pigtails 18.

Further, first slits 16a are formed on the core-side connection plate 16 in circumferential positions where the brush holders 14 that hold the positive brushes 10a are disposed, and second slits 16b are formed in circumferential positions where the brush holders 14 that hold the negative brushes 10b are disposed.

First slits 17a are formed on the counter-core-side connection plate 17 in circumferential positions where the brush holders 14 that hold the negative brushes 10b are disposed, and second slits 17b are formed in circumferential positions where the brush holders 14 that hold the positive brushes 10a are disposed.

Hereinafter, the brush holders 14 that hold the positive brushes 10a are referred to as first brush holders 14A, and the brush holders 14 that hold the negative brushes 10b are referred to as second brush holders 14B.

Note that common functions and shapes between the first brush holders 14A and the second brush holders 14B will be described by assigning the same reference numerals.

The first slits 16a, 17a formed in the core-side connection plate 16 and the counter-core side plates 17 are open to the outside in the radial direction and extend halfway to the inside of the plates in the radial direction.

On the other hand, the second slits 16b, 17b are open to the inside in the radial direction and extend halfway to the outside of the plates in the radial direction.

In other words, the core-side connection plate 16 and the counter-core-side connection plate 17 have flat plate portions between the first slits 16a, 17a and the second slits 16b, 17b, in the circumferential direction, and bridge portions 16c, 17c that connect flat plate portions adjacent to each other in the circumferential direction are formed inside of the first slits 16a, 17a in the radial direction and outside of the second slits 16b, 17b in the radial direction.

Incidentally, the pigtails 18 of the positive brushes 10a and the negative brushes 10b are connected to the flat plate portions of the core-side connection plate 16 and the flat plate portions of the counter-core-side connection plate 17, respectively.

A core-side attaching portion to the core-side connection plate 16 is disposed at a core side end of the first brush holder 14A, and a counter-core-side attaching portion to the counter-core-side connection plate 17 is disposed at a counter-core-side end of the first brush holder 14A.

The core-side attaching portion has a slit insertion portion 19 that is inserted into the first slit 16a of the core-side connection plate 16, and a supporting portion 20 formed on the core side of the slit insertion portion 19.

The slit insertion unit 19 is disposed protruding from a core-side end face of the first brush holder 14A, and has the axial height that is substantially the same as the thickness of the core-side connection plate 16.

The supporting portion 20 has a plate shape and is disposed extending in the circumferential direction from both sides in the circumferential direction of the slit insertion portion 19, and is formed so that a circumferential dimension thereof is greater than the circumferential width of the first slit 16a.

Further, in the core-side attaching portion, a pair of guiding grooves 21, of which sides of the slit insertion portion 19 in the circumferential direction as groove bottoms, are formed between the core-side end face of the first brush holder 14A that faces in the height direction (axial direction) of the slit insertion portion 19 and an inner surface of the supporting portion 20 (counter-core side surface).

Note that a first engagement surface and a second engagement surface as set forth in claim 7 of the present disclosure are the core-side end face of the first brush holder 14A and the inner surface of the supporting portion 20 that form the guiding grooves 21.

The counter-core-side attaching portion has a convex portion 22 that can be press-fit into the second slit 17b formed in the counter-core-side connection plate 17 and a radial direction regulating portion 23 disposed inside in the radial direction of the convex portion 22

The radial direction regulating portion 23 is disposed so as to be curved in an arc shape extending in the circumferential direction from both sides of the convex portions 22, and has a function to regulate an outside position in the radial direction of the first brush holder 14A relative to the counter-core-side connection plate 17.

A counter-core-side attaching portion to the counter-core-side connection plate 17 is disposed at a counter-core-side end of the second brush holder 14B, and a core-side attaching portion to the core-side connection plate 16 is disposed at a core side end of the second brush holder 14B.

Functions and shapes of the counter-core-side attaching portion and the core-side attaching portion of the second brush holder 14B are the same as those of the first brush holder 14A, thus duplicating descriptions will be omitted.

Note that a first engagement surface and a second engagement surface as set forth in claim 8 of the present disclosure are the counter-core-side end face of the second brush holder 14B and the core side surface of the supporting portion 20 that form the guiding grooves 21.

U-shaped grooves 24 are formed on respective side surface in the circumferential direction of the first brush holders 14A and the second brush holders 14B for leading out the pigtails 18.

Next, assembling method of the brush ASSY will be described.

Figure 2:
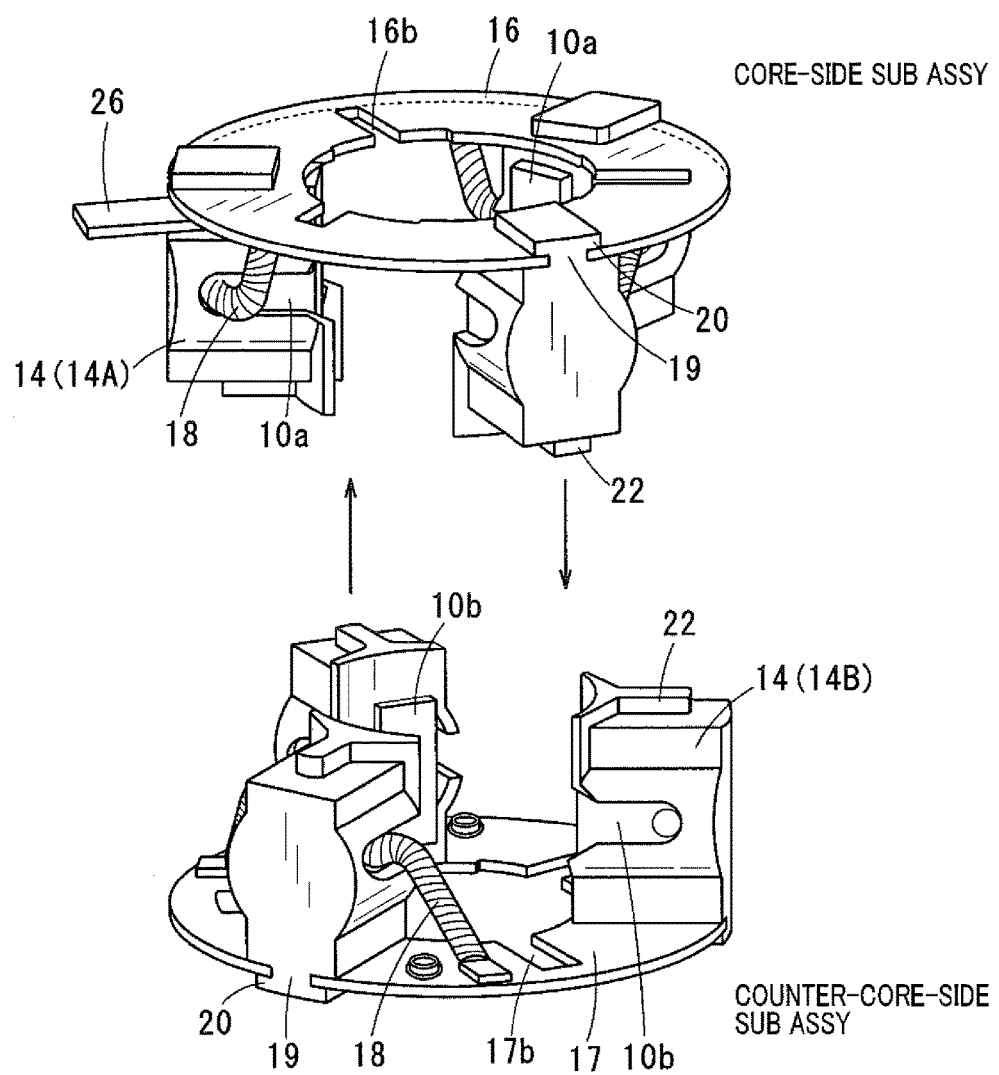
FIG. 2 shows a perspective view of the brush ASSY in a state before assembling according to the first embodiment.

As shown in FIG. 2, the brush ASSY is constituted by combining a core-side sub ASSY and a counter-core-side sub ASSY. The core-side sub ASSY is configured by accommodating the three positive brushes 10a together with the brush pressing members 15 in the first brush holders 14A. The counter-core-side sub ASSY is configured by accommodating the three negative brushes 10b together with the brush pressing members 15 in the second brush holders 14B.

As shown in FIG. 3, the core-side sub ASSY and counter-core-side sub ASSY are assembled by placing a cylindrical jig 25, which regulates inside positions in the radial direction of the positive brushes 10a and the negative brushes 10b, in a central portion in the radial direction of the sub ASSYs.

The core-side sub ASSY is formed by inserting the slit insertion portions 19 of the first brush holders 14A into the first slits 16a from the outer circumferential side of the core-side connection plate 16.

The brush pressing members 15 and the positive brushes 10a are incorporated in the first brush holders 14A during the process of assembling the first brush holders 14A to the core-side connection plate 16.

The inside positions in the radial direction of the first brush holders 14A with respect to the core-side connection plate 16 are regulated by inside ends of the slit insertion portions 19 to abut against inside ends of the first slits 16a.

Further, when inserting the slit insertion portions 19 into the first slits 16a, both sides in the circumferential direction of the first slits 16a are inserted into the pairs of guiding grooves 21 formed on the core side attaching portions of the first brush holders 14A.

In other words, axial positions of the first brush holders 14A relative to the core-side connection plate 16 are regulated by the both sides in the circumferential direction of the first slits 16a being sandwiched between the core-side end faces of the first brush holders 14A that form the guiding grooves 21 and the inner surfaces of the supporting portions 20 (refer to FIG. 2).

Similarly to the core-side sub ASSY, the second brush holders 14B are assembled to the counter-core-side connection plate 17 by inserting the slit insertion portions 19 provided in the second brush holders 14B into the first slits 17a from outside in the radial direction of the counter-core-side connection plate 17 in the counter-core-side sub ASSY.

Then, the brush ASSY is constituted by combining the core-side sub ASSY and the counter-core-side sub ASSY.

In other words, the convex portions 22 provided on the counter-core side of the first brush holders 14A are press-fitted in the axial direction into the second slits 17b formed in the counter-core-side connection plate 17, and similarly, the convex portions 22 provided on the core side of the second brush holders 14B are press-fitted in the axial direction into the second slits 16b formed in the core-side connection plate 16.

Figure 1:
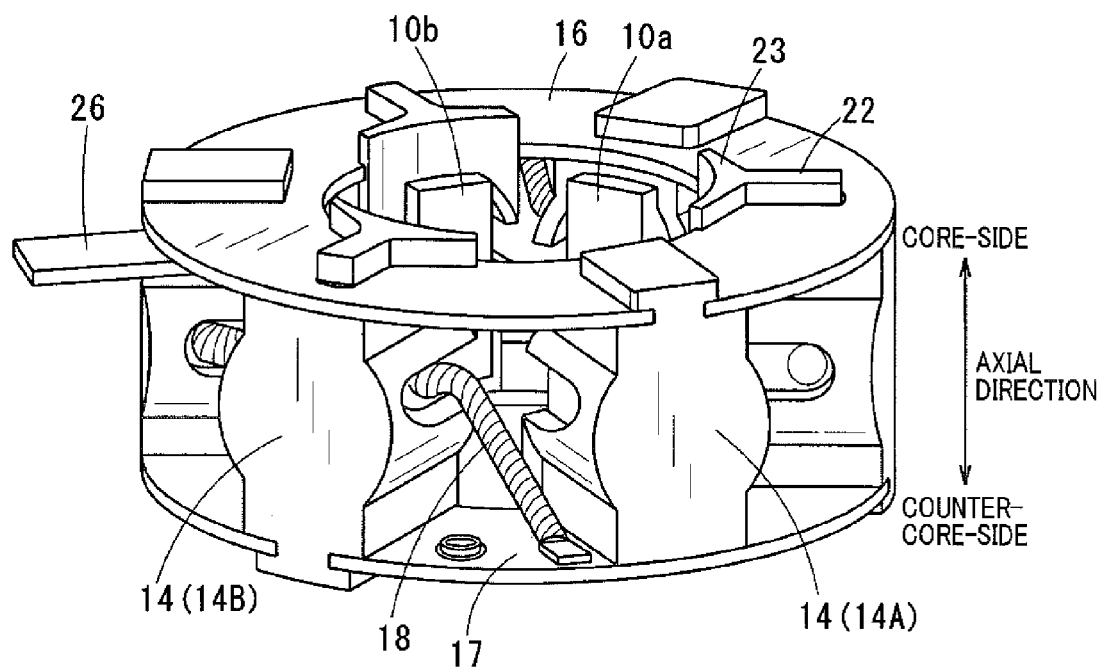
FIG. 1 shows a perspective view of a brush ASSY (assembly) according to a first embodiment.

The outside positions in the radial direction of the first brush holders 14A relative to the counter-core-side connection plate 17 are regulated by the arcuate radial direction position regulating portions 23 formed on the counter-core side being abut to the inner circumferential edge of the counter-core-side connection plate 17, which functions as a first regulating member (refer to FIG. 1).

Similarly, the outside positions in the radial direction of the second brush holders 14B relative to the core-side connection plate 16 are regulated by the arcuate radial direction position regulating portions 23 formed on the core side being abut to the inner circumferential edge of the core-side connection plate 16, which functions as a second regulating member.

The core-side connection plate 16 of the brush ASSY is electrically connected to an M terminal bolt 27 (refer to FIG. 4) of the electromagnetic switch 5 via a conductive lead member 26, and the counter-core-side connection plate 17 of the brush ASSY is electrically connected to an end frame 28 (a motor casing as described in claim 15) of the motor 2 that forms a part of a ground circuit by being fixed to the end frame 28a by a bolt 29.

Note that the core-side connection plate 16 and the counter-core-side connection plate 17 are disposed in line in the axial direction without being electrically contacted with each other sandwiching the first brush holders 14A and the second brush holders 14B composed of insulating materials.

[Functions and Effects of the First Embodiment]

1) The brush ASSY described in the first embodiment is capable of assembling the first brush holders 14A from the outer circumferential side of the core-side connection plate 16, and similarly, is capable of assembling the second brush holders 14B from the outer circumferential side of the counter-core-side connection plate 17.

Therefore, when assembling the first brush holders 14A and the second brush holders 14B, it is possible to prevent the positive brushes 10a and the negative brushes 10b from dropping out by the jig 25 that is disposed at the central position in the radial direction, thus assemblability can be improved.

2) After assembling the first brush holders 14A on the core-side connection plate 16, the outside positions of the brush holders 14A in the radial direction are regulated by press-fitting the convex portions 22 of the first brush holders 14A into the second slits 17b of the counter-core-side connection plate 17.

Similarly, after assembling the second brush holders 14B on the counter-core-side connection plate 17, the positions of the second brush holders 14B outside in the radial direction are regulated by press-fitting the convex portions 22 of the second brush holders 14B into the second slits 16b of the core-side connection plate 16.

By adopting this press-fitting structure, fixing of the first brush holders 14A and the counter-core-side connection plate 17, and fixing of the second brush holders 14B and the core-side connection plate 16 become easy.

Moreover, since it is not necessary to use a separate part in order to regulate the positions of the first brush holders 14A and the second brush holders 14B outside in the radial direction, number of parts does not increase.

As a result, when assembling the brush ASSY, it is easy to work and it is possible to reduce the labor required for the work, thus the productivity improves.

3) Since the first brush holders 14A are assembled from the outer circumferential side of the core-side connection plate 16, the first brush holders 14A can be assembled on the core-side connection plate 16 without interfering from each other, even when the three first brush holders 14A are assembled at the same time, for example.

Similarly, since the second brush holders 14B are assembled from the outer circumferential side of the counter-core-side connection plate 17, the second brush holders 14B can be assembled on the counter-core side connection plate 17 without interfering to each other, even when the three second brush holders 14B are assembled at the same time, for example.

Therefore, it is possible to shorten the assembly process by assembling the three first brush holders 14A and the three second brush holders 14B simultaneously.

Other embodiments of the present disclosure will be described in the following.

Note that components and compositions showing the common to those of the first embodiment, detailed description thereof will be omitted by assigning the same reference numerals as in the first embodiment.

[Second Embodiment]

The second embodiment is a case where assembling structures of the first brush holders 14A to the counter-core-side connection plate 17 and the second brush holders 14B to the core-side connection plate 16 are different from the press-fitting assembling structure as described in first embodiment (the structure of press-fitting the convex portions 22 into the second slits 16b, 17b).

Figure 7:
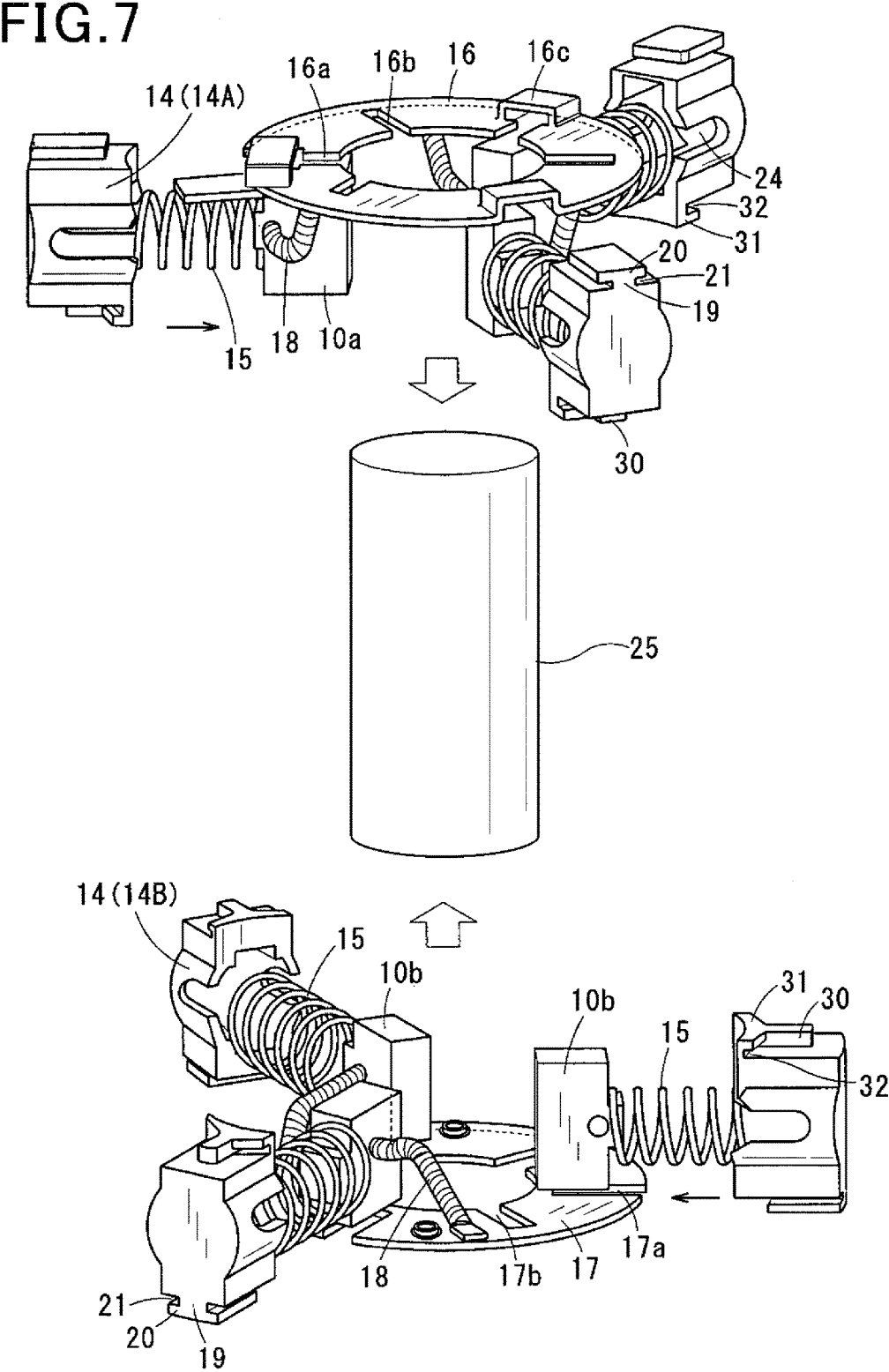
FIG. 7 shows a perspective view of a core-side sub ASSY and a counter-core-side sub ASSY in a state before assembling according to the second embodiment.

As shown in FIG. 7, the first brush holders 14A include second slit insertion portions 30 and position regulating portions 31 on counter-core sides thereof.

The second slit insertion portions 30 have convex shapes that can be inserted into the second slits 17b from the inner circumferential side of the counter-core-side connection plate 17.

The position regulating portions 31 have functions of regulating the axial positions and the outer radial positions of the first brush holders 14A relative to the counter-core-side connection plate 17.

The position regulating portions 31 are disposed inside in the radial direction of the second slit insertion portions 30, and fitting grooves 32 that open toward the outside in the radial direction are formed thereon.

The second brush holders 14B include second slit insertions portion 30 and position regulating portions 31 on the core side thereof, and have similar functions as the second slit insertion portions 30 and the position regulating portions 31 disposed in the first brush holders 14A.

Figure 6:
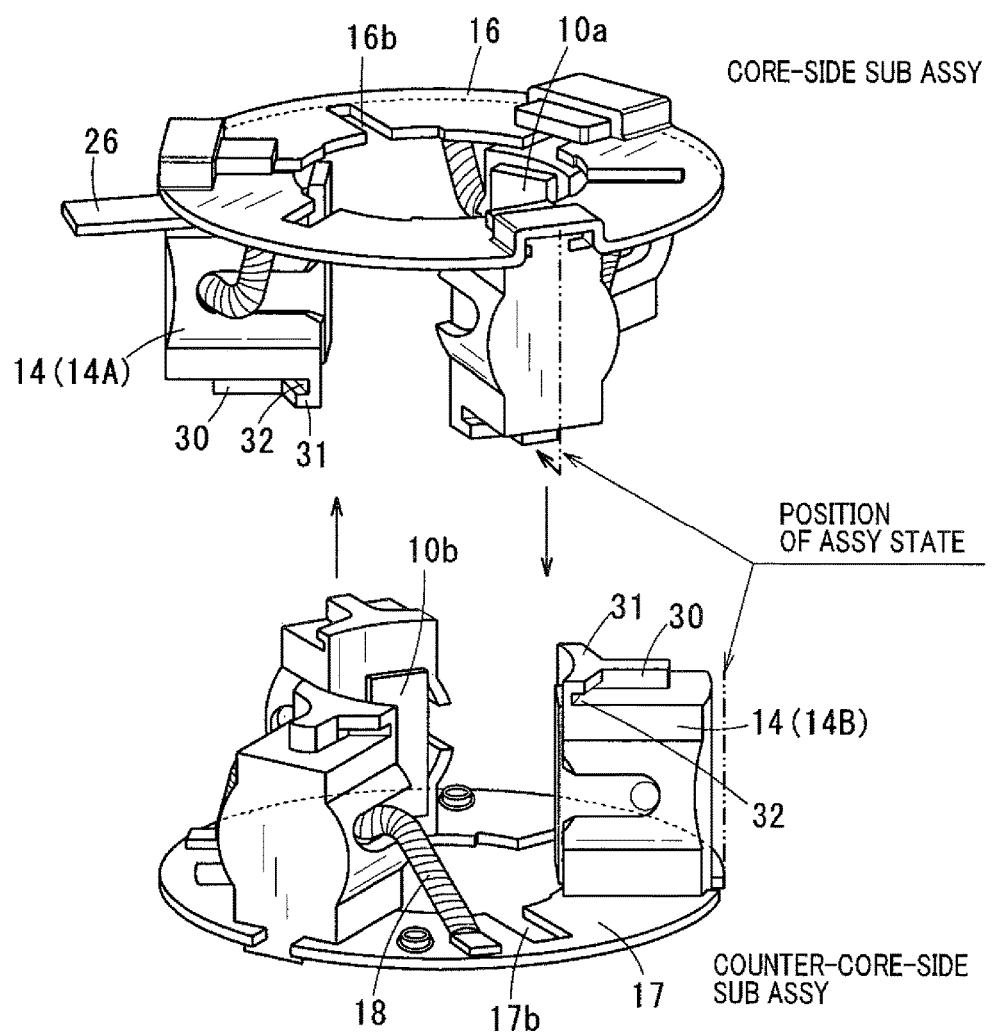
FIG. 6 shows a perspective view of the brush ASSY in a state before assembling according to the second embodiment.

As shown in FIG. 6, when inserting the slit insertion portions 19 into the first slits 16a of the core-side connection plate 16, the first brush holder 14A can be assembled slidably further to the inner circumferential side from a position of an ASSY (assembled) state (a position shown by a two-dot chain line in FIG. 6).

Figure 5:
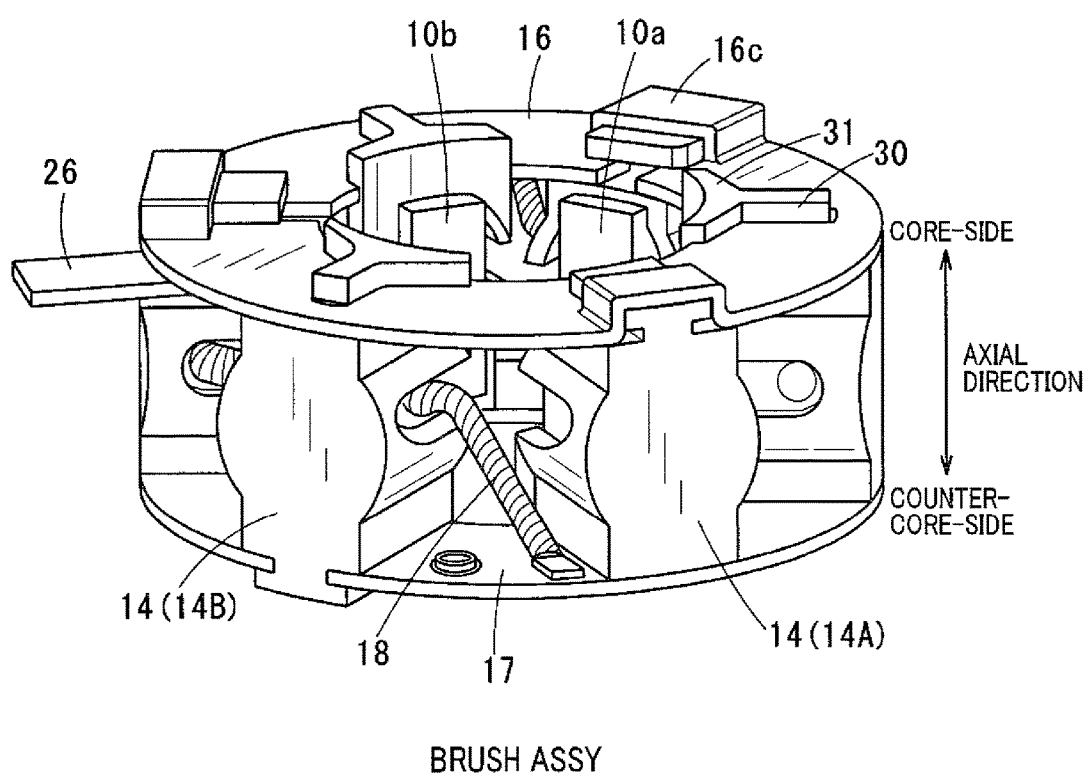
FIG. 5 shows a perspective view of a brush ASSY according to a second embodiment.

Note that the positions of the ASSY state is a state where all the brush holders 14 in which the brush pressing members 15 and the brushes 10 are incorporated are assembled to the core-side connection plate 16 and the counter-core-side connection plate 17, i.e., the position of the brush holders 14 outside in the radial direction in a state of the brush ASSY shown in FIG. 5.

The first slit 16a of the core-side connection plate 16 is formed longer than that of the first embodiment so that the first brush holder 14A can slide further toward the inner circumferential side more inwardly than in the positions of the ASSY state.

Alternatively, as shown in FIG. 7, the first slit 16a is formed across the core-side connection plate 16 from the outer periphery to the inner periphery thereof.

In this case, bridge portions 16c connecting flat portions formed on both sides of the first slits 16a in the circumferential direction with each other are disposed on a core side in a plate thickness direction of the core-side connection plate 16a (a side opposite to the side where the first brush holders 14A are disposed).

The bridge portions 16c are formed across the first slits 16a like tunnels so that the bridge portions 16c do not interfere with the slit insertion portions 19 and the supporting portions 20 when inserting the slit insertion portions 19 of the first brush holders 14A into the first slits 16a.

Although the first slit 17a is not formed across the counter-core-side connection plate 17 from the outer periphery to the inner periphery, the first slit 17a is formed longer than that of the first embodiment so that the second brush holder 14B can slide further toward the inner circumferential side more inwardly than in the positions of the ASSY state.

Similarly to the first embodiment, the first brush holders 14A and the second brush holders 14B are assembled by placing the cylindrical jig 25 (refer to FIG. 7), which regulates inside positions in the radial direction of the positive brushes 10a and the negative brushes 10b, in the central portion in the radial direction of the sub ASSYs, and are assembled to the core-side connection plate 16 and the counter-core-side connection plate 17, respectively.

After inserting the slit insertion portions 19 into the first slits 16a from the outer circumferential side of the core-side connection plate 16 and sliding the first brush holders 14A further to the inner circumferential side from the positions of the ASSY state, when returning to the positions of the ASSY state, the second slit insertion portions 30 slide in the second slits 17b from the inner circumferential side to the outer circumferential side of the counter-core-side connection plate 16.

When the second slit insertion portions 30 slide in the second slits 17b from the inner circumferential side to the outer circumferential side, the inner circumferential side of the counter-core-side connection plate 17 fits to the fitting grooves 32 formed in the position regulating portions 31.

Thereby, the axial positions of the first brush holders 14A relative to the counter-core-side connection plate 17 are regulated.

In addition, the first brush holders 14A are regulated at the positions of the ASSY state by the inner circumferential edge of the counter-core-side connection plate 17 fitted to the fitting grooves 32 abutting against the groove bottoms of the fitting grooves 32.

Alternatively, the first brush holder 14A may also be regulated at the positions of the ASSY state by the outer circumferential edges of the second slit insertion portions 30 abutting against the outer circumferential edges of the second slits 17b.

Similarly to the first brush holders 14A, after sliding the second brush holders 14B further to the inner circumferential side from the positions of the ASSY state relative to the counter-core-side connection plate 17, when returning to the positions of the ASSY state, the second slit insertion portions 30 slide in the second slits 16*b* from the inner circumferential side to the outer circumferential side of the core-side connection plate 16.

At this time, the axial positions of the second brush holders 14B relative to the core-side connection plate 16 are regulated by the inner circumferential side of the core-side connection plate 16 fitting to the fitting grooves 32 formed in the position regulating portions 31, and the second brush holders 14B are regulated at the positions of the ASSY state by the inner circumferential edge of the core-side connection plate 16 fitted to the fitting grooves 32 abutting against the groove bottoms of the fitting grooves 32.

Even in the configuration of the second embodiment, since the outside positions in the radial direction of the first brush holders 14A are regulated by the counter-core-side connection plate 17 by assembling the first brush holders 14A from the outer circumferential side of the core-side connection plate 16, and the outside positions in the radial direction of the second brush holders 14B are regulated by the core-side connection plate 16 by assembling the second brush holders 14B from the outer circumferential side of the counter-core-side connection plate 17, it is possible to obtain the same effects as in the first embodiment.

[Third Embodiment]

A third embodiment is a first case of a motor 2 with an electromagnet field system.

Figure 8:
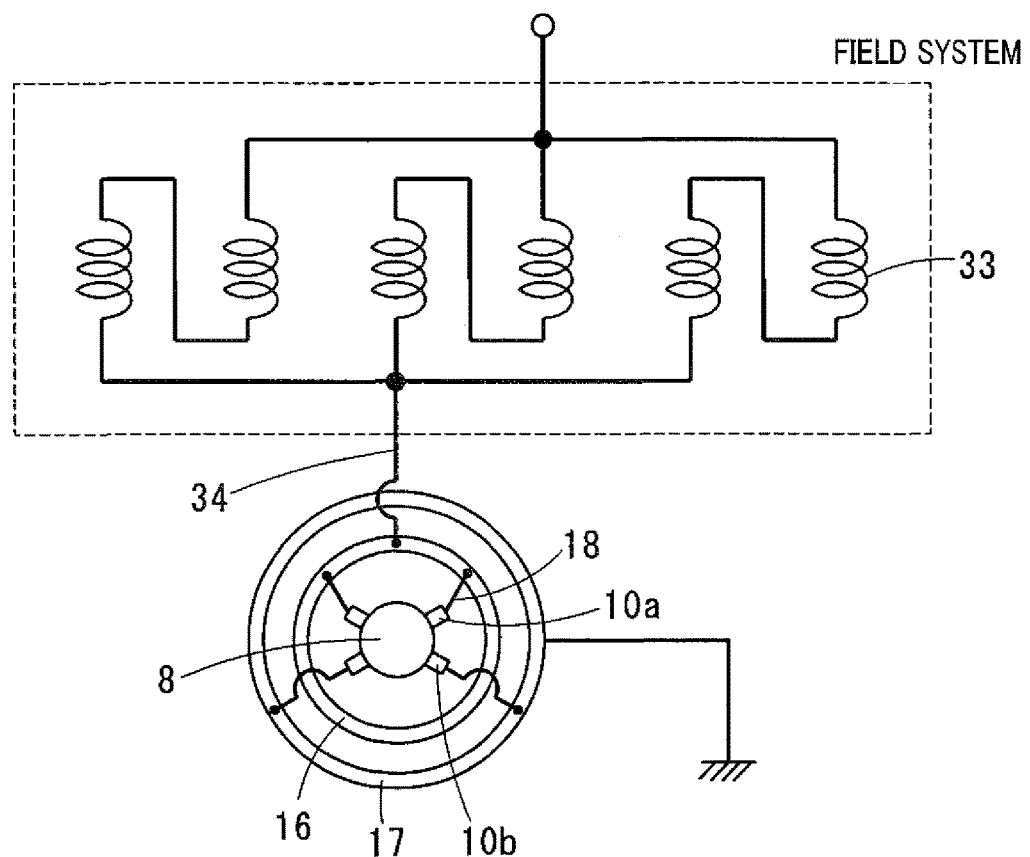
FIG. 8 shows a connection diagram of a motor according to a third embodiment.

As shown in FIG. 8, the motor 2 of the third embodiment includes a magnet field system for forming field poles by energizing field coils 33 and an armature 8 that has wave-wound armature coils 13, and is a series-wound type in which the field coils 33 are connected in series with the armature coils 13.

In addition, the motor 2 has a configuration that the number of the positive brushes 10*a* that are connected to the core-side connection plate 16 via the pigtails 18 is less than a half the number of the field poles (two in FIG. 8), and the field coils 33 and the core-side connection plate 16 are electrically connected via a single lead wire 34.

In the above configuration, it is possible to easily make a connection even if the number of ends of the field coils 33 that are connected to the core-side connection plate 16 and the number of the positive brushes 10*a* are different.

For example, in the case of FIG. 8, the number of positive brushes 10*a* may be configured to two (or one) for a six-pole field magnet that has the field coils 33 connected into two-series and three-parallel.

It should be noted that although the case of the series-wound type motor 2 is shown in FIG. 8, it may be a double-winding type motor that connects the field coils 33 and the armature coils 13 in series and parallel.

Figure 9:
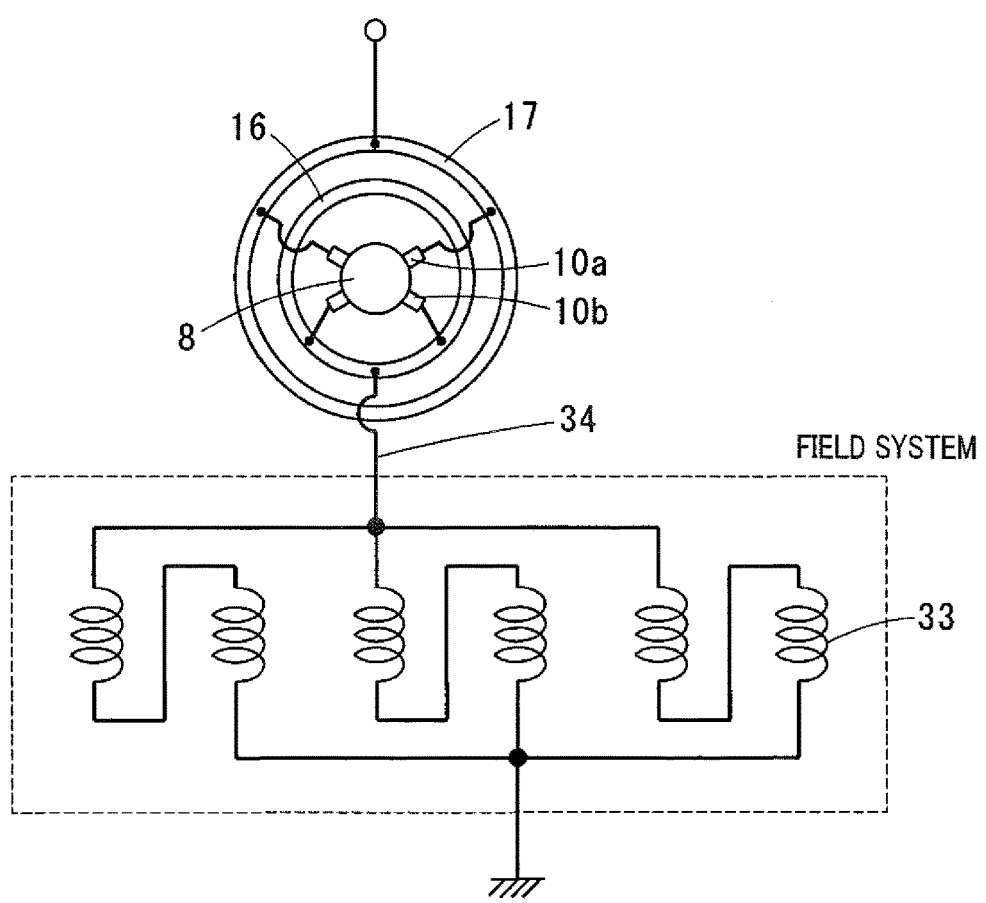
FIG. 9 shows another connection diagram of the motor according to the third embodiment.

Further, as shown in FIG. 9, it may be configured to connect the field coils 33 to a ground side with respect to the armature 8.

In this case, the negative brushes 10*b* are connected to the core-side connection plate 16, and the positive brushes 10*a* are connected to the counter-core-side connection plate 17.

[Fourth Embodiment]

A fourth embodiment is a second case of a motor 2 with an electromagnet field system.

The motor 2 of fourth embodiment has features that the field coils 33 of all the poles are connected in series or parallel-connected pairs.

Figure 10:
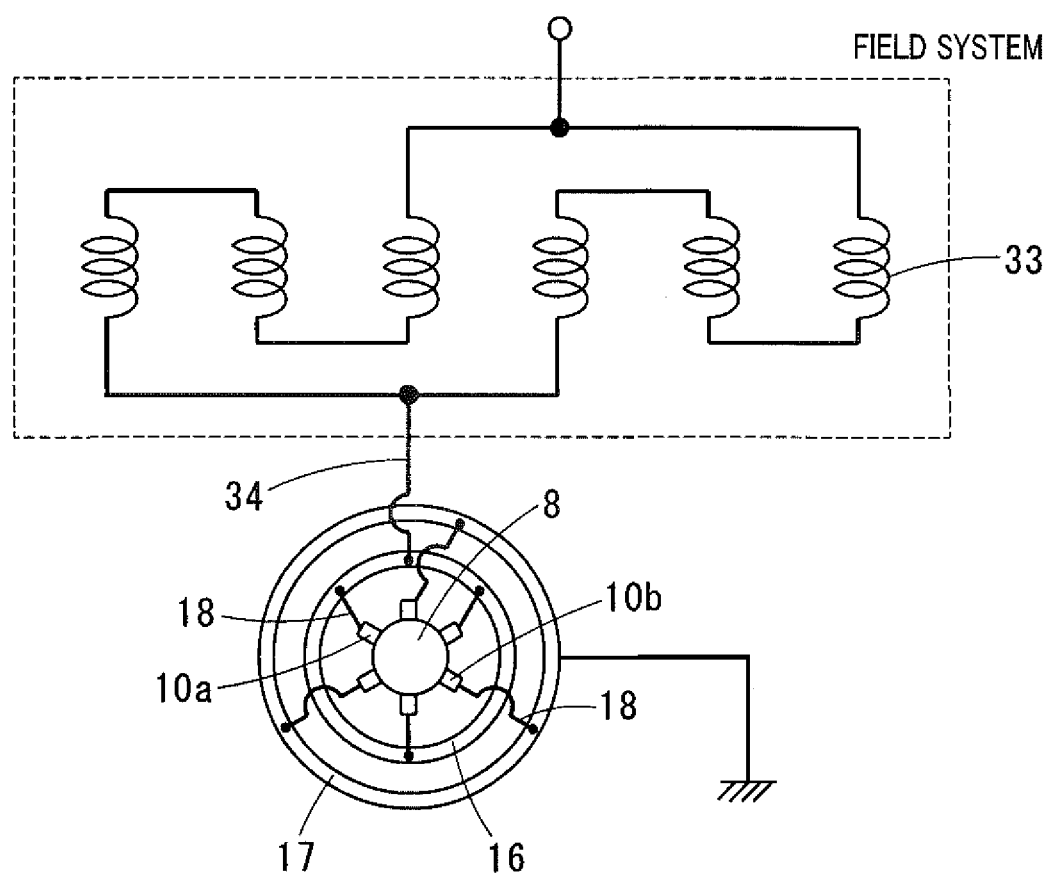
FIG. 10 shows a connection diagram of a motor according to a fourth embodiment.

An electromagnetic field shown in FIG. 10 is a case of 6 poles-3 series-2 parallel.

Figure 12:
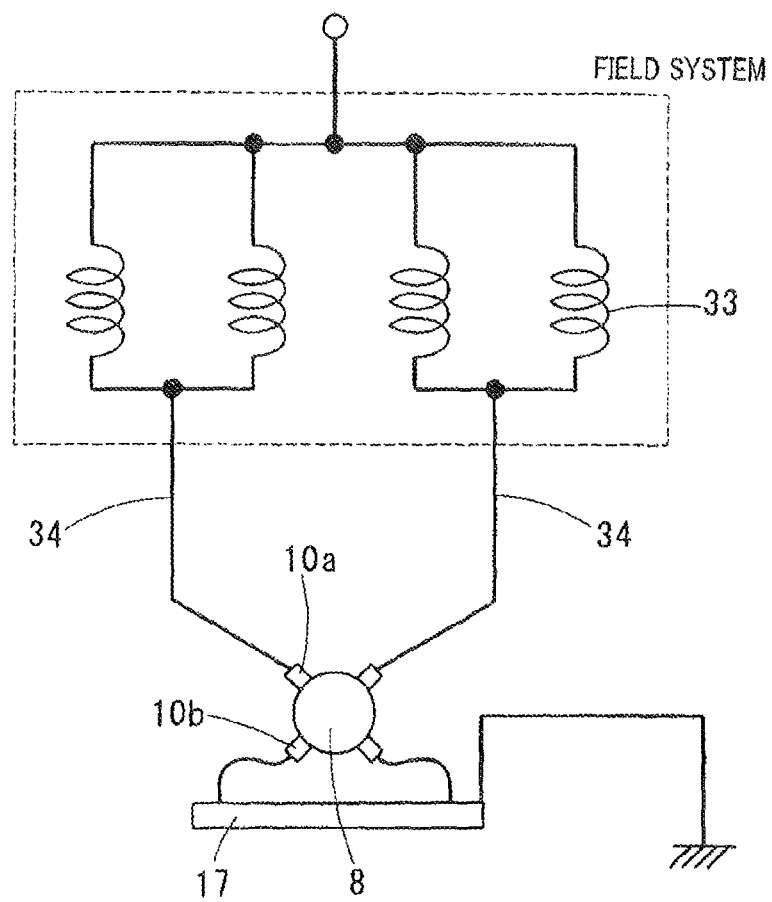
FIG. 12 shows a connection diagram of a typical DC motor having a magnet field system.

In the conventional DC motor with an electromagnetic field system, as shown in FIG. 12, each of the positive brushes 10*a* is connected to the field coils 33 via the lead wire 34, respectively.

Therefore, the numbers of lead wires 34 required are the numbers of positive brushes 10*a* (two in FIG. 12).

In contrast, in the motor 2 of the fourth embodiment, as shown in FIG. 10, regardless of the number of the positive brushes 10*a*, it is possible to connect the field coils 33 and the core-side connection plate 16 by a single lead wire 34, therefore a motor 2 with a minimum number of components that is low in cost can be realized.

Figure 11:
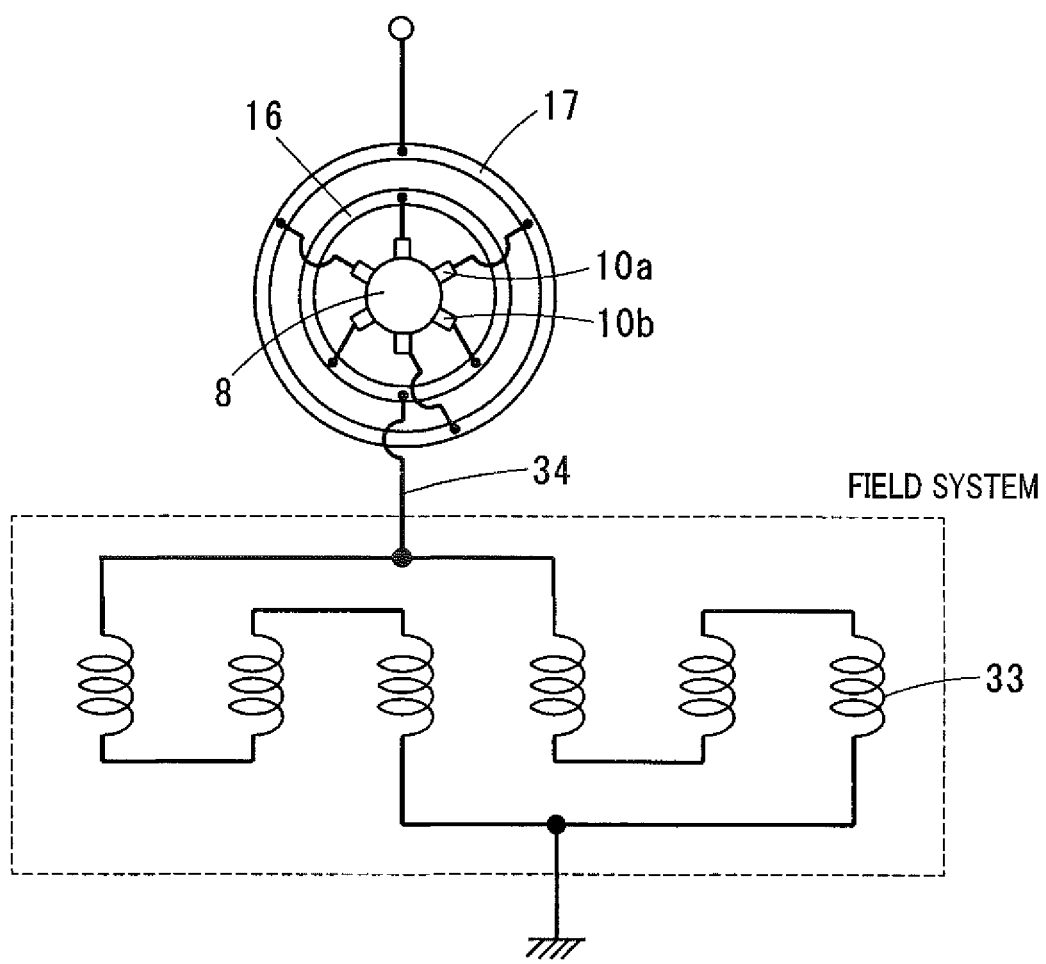
FIG. 11 shows another connection diagram of the motor according to the fourth embodiment.

As shown in FIG. 11, the motor 2 of the fourth embodiment may be configured to connect the field coils 33 to a ground side with respect to the armature 8.

In this case, the negative brushes 10*b* are connected to the core-side connection plate 16, and the positive brushes 10*a* are connected to the counter-core-side connection plate 17.

[Modifications]

Although the configuration where the positive brushes 10*a* are connected to the core-side connection plate 16 while the negative brushes 10*b* are connected to the counter-core-side connection plate 17 is described in the first and second embodiments, it may be configured to connect the positive brushes 10*a* to the counter-core-side connection plates 17 and the negative brushes 10*b* to the core-side connection plate 16.

Although the outside positions in the radial direction of the first brush holders 14A and the second brush holders 14B relative to the core-side connection plate 16 and the counter-core-side connection plate 17 are regulated by the arcuate radial regulating portions 23 in the first embodiment, it is also possible to regulate the outside positions by abutting ends of the convex portions 22 (ends in sides opposite to the radial direction regulating portions) to ends of the second slits 16*b*, 17*b*.

Although it is configured that the convex portions 22 of the first brush holders 14A are press-fit into the second slits 17*b* formed in the counter-core-side connection plate 17, and the convex portions 22 of the second brush holders 14B are press-fit into the second slits 16*b* formed in the core-side connection plate 16 in the first embodiment, either one of the core-side and the counter-core-side may employ the press-fitting configuration.

Although the bridge portions 16*c* that across the first slits 16*a* like the tunnels in the circumferential direction are disposed on the core side in the thickness direction with respect to the core-side connection plate 16 in the second embodiment, it is possible to dispose similar bridge portions 17*c* on the counter-core-side connection plate 17.

Alternatively, the tunnel-like bridge portions 17*c* may be disposed only on the counter-core-side connection plate 17.

In second embodiment, it has the configuration that after sliding the first brush holders 14A further to the inner circumferential side from the positions of the ASYY state relative to the core-side connection plate 16, when returning to the positions of the ASSY state, the second slit insertion portions 30 are inserted into the second slits 17*b* in the counter-core-side connection plate 17 and the first brush holders 14A are assembled to the counter-core-side connection plate 17, and the second brush holders 14B have the same configuration.

However, optionally, only either ones of the first brush holders 14A and the second brush holders 14B may employ the above configuration (the configuration of returning to the positions of the ASSY state after sliding further into the inner circumferential side from the positions of the ASYY state).

What is claimed is:

1. A DC motor having four or more poles comprising:
a cylindrical commutator composed on an axis of an armature;
brushes composed of positive brushes and negative brushes disposed on an outer periphery of the cylindrical commutator;
brush holders that hold the brushes;
brush pressing members accommodated in the brush holders that press the brushes toward the cylindrical commutator;
an electrically conductive first connection plate to which all the positive brushes or all the negative brushes are electrically connected individually via pigtails; and
an electrically conductive second connection plate to which all the negative brushes or all the positive brushes are electrically connected individually via the pigtails; wherein,
the brush holder of which an inner circumferential side in a radial direction facing the cylindrical commutator is opened includes a wall on an outer circumferential side in the radial direction thereof that regulates an outside position in the radial direction of the brush pressing member, an armature core side in an axial direction of the brush holder, which is referred to as a core side, is assembled to the first connection plate, and a counter-armature core side in the axial direction of the brush holder, which is referred to as a counter-core-side, is assembled to the second connection plate;
when referring to the brush holder that holds the brush connected to the first connection plate via a pigtail of the pigtails as a first brush holder, and the brush holder that holds the brush connected to the second connection plate via the pigtail as a second brush holder;
a slit that opens outside in the radial direction and extends halfway to inside is formed in the first connection plate at a circumferential position where the first brush holder is disposed; and
the first brush holder has a slit insertion portion on the core side in the axial direction, the first brush holder is assembled to the first connection plate by inserting the slit insertion portion into the slit from an outer circumferential side of the first connection plate, and an outside position in the radial direction of the first brush holder with respect to the first connection plate is regulated by a single first regulating member.

2. The DC motor according to claim 1, wherein,
a slit that opens outside in the radial direction and extends halfway to inside is formed in the second connection plate at a circumferential position where the second brush holder is disposed; and
the second brush holder has a slit insertion portion on the counter-core side in the axial direction, the second brush holder is assembled to the second connection plate by inserting the slit insertion portion into the slit from an outer circumferential side of the second connection plate, and an outside position in the radial direction of the second brush holder with respect to the second connection plate is regulated by a single second regulating member.

3. The DC motor according to claim 2, wherein,
the brush holder is formed of insulating material;
the first connection plate and the second connection plate are disposed in line in the axial direction without being electrical contacted with each other sandwiching the brush holder; and
the first connection plate also functions as the second regulating member.

4. The DC motor according to claim 2, wherein,
at least one of a plurality of the second brush holders has a first engagement surface and a second engagement surface at both ends in the axial direction of the slit insertion portion, respectively;
circumferential dimensions of the first engagement surface and the second engagement surface are larger than the width in the circumferential direction of the silt formed in the first connection plate;
a guiding groove is formed between the first engagement surface and the second engagement surface such that a circumferential direction side of the slit insertion portion becomes a groove bottom; and
both sides in the circumferential direction of the slit are inserted into the guiding groove and are sandwiched between the first engagement surface and the second engagement surface in a state where the slit insertion portion is inserted into the slit.

5. The DC motor according to claim 1, wherein,
a slit that opens outside in the radial direction and extends to a radially middle position is formed in the second connection plate at a circumferential position where the second brush holder is disposed, and a bridge portion that crosses at least a part of the slit in a circumferential direction is disposed on a core side in a thickness direction of the second connection plate to connect both sides of the slit; and
the second brush holder has a slit insertion portion on the counter-core side in the axial direction, the second brush holder is assembled to the second connection plate by inserting the slit insertion portion into the slit from an outer circumferential side of the second connection plate via inside the bridge portion, and an outside position in the radial direction of the second brush holder with respect to the second connection plate is regulated by a single second regulating member.

6. The DC motor according to claim 1, wherein,
the brush holder is formed of insulating material;
the first connection plate and the second connection plate are disposed in line in the axial direction without being electrical contacted with each other sandwiching the brush holder; and
the second connection plate also functions as the first regulating member.

7. The DC motor according to claim 1, wherein,
at least one of a plurality of the first brush holders has a first engagement surface and a second engagement surface at both ends in the axial direction of the slit insertion portion, respectively;
circumferential dimensions of the first engagement surface and the second engagement surface are larger than the width in the circumferential direction of the slit formed in the first connection plate;
a guiding groove is formed between the first engagement surface and the second engagement surface such that a circumferential direction side of the slit insertion portion becomes a groove bottom; and
both sides in the circumferential direction of the slit are inserted into the guiding groove and are sandwiched between the first engagement surface and the second engagement surface in a state where the slit insertion portion is inserted into the slit.

8. The DC motor according to claim 1, wherein,
at least one of the plurality of the first brush holders has a convex portion on a counter-core side in the axial direction, and the convex portion is fixed to the second connection plate by a press-fitting structure.

9. The DC motor according to claim 1, wherein,
at least one of the plurality of the second brush holders has a convex portion on a core side in the axial direction, and the convex portion is fixed to the first connection plate by a press-fitting structure.

10. The DC motor according to claim 1, wherein,
when an assembled state is defined as a state where all of the brush holders are assembled to the first connection plate and the second connection plate;
at least one of the plurality of the first brush holders is assembled to the first connection plate so that the first brush holder can slide further toward the inner circumferential side more inwardly than in a position of the assembled state, and has a second slit insertion portion on the inner circumferential side in the radial direction and on the counter-core side in the axial direction;
a second slit is formed on the second connection plate from inside to halfway toward outside in the radial direction at a position in the circumferential position where at least one of the first brush holders is disposed;
when a slide position is defined as a position where at least one of the first brush holders that is slid in the inner circumferential side more inwardly than in a position of the assembled state with respect to the first connection plate; and
when returning at least one of the first brush holders from the slide position to the position of the assembled state, the second slit insertion portion slides in the second slit from the inner circumferential side to the outer circumferential side of the second connection plate.

11. The DC motor according to claim 10, wherein,
at least one of the first brush holders has a position regulating portion that regulates an axial position of the first brush holder relative to the second connection plate at the inner circumferential side in the radial direction and at the counter-core side in the axial direction;
a fitting groove that opens toward outside in the radial direction is formed on the position regulating portion; and
when the second slit insertion portion slides in the second slit from the inner circumferential side to the outer circumferential side of the second connection plate, the axial position of at least one of the first brush holder relative to the second connection plate is regulated by the inner circumferential side of the second connection plate fitted into the fitting groove.

12. The DC motor according to claim 1, wherein,
when an assembled state is defined as a state where all of the brush holders are assembled to the first connection plate and the second connection plate;
at least one of the plurality of the second brush holders is assembled to the second connection plate so that the second brush holder can slide further toward the inner circumferential side more inwardly than in a position of the assembled state, and has a second slit insertion portion on the inner circumferential side in the radial direction and on the core side in the axial direction;
a second slit is formed on the first connection plate from inside to halfway toward outside in the radial direction at a position in the circumferential position where at least one of the second brush holders is disposed;
when a slide position is defined as a position where at least one of the second brush holders that is slid in the inner circumferential side more inwardly than in a position of the assembled state with respect to the second connection plate; and
when returning at least one of the second brush holders from the slide position to the position of the assembled state, the second slit insertion portion slides in the second slit from the inner circumferential side to the outer circumferential side of the first connection plate.

13. The DC motor according to claim 12, wherein,
at least one of the second brush holders has a position regulating portion that regulates an axial position of the second brush holder relative to the first connection plate at the inner circumferential side in the radial direction and at the core side in the axial direction;
a fitting groove that opens toward outside in the radial direction is formed on the position regulating portion; and
when the second slit insertion portion slides in the second slit from the inner circumferential side to the outer circumferential side of the first connection plate, the axial position of at least one of the first brush holder relative to the first connection plate is regulated by the inner circumferential side of the first connection plate fitted into the fitting groove.

14. The DC motor according to claim 1, wherein,
all the positive brushes are connected to the first connection plate;
all the negative brushes are connected to the second connection plate; and
the second connection plate is directly fixed to a motor case that forms a part of a ground circuit so that the second connection plate is electrically connected to the motor case.

15. The DC motor according to claim 1, wherein,
there are provided the armature of which an armature coil wound around the armature core is a wave-winding, and an electromagnet field system that has field coils connected to the armature coil in series or in series and parallel and forms field poles by energizing the field coils;
the number of the brushes that are connected to the first connection plate via the pigtails is less than a half the number of the field poles; and
the field coils and the first connection plate are electrically connected.

16. The DC motor according to claim 1, wherein,
there is provided an electromagnet field system that forms field poles by energizing field coils;
the field coils of all the poles are connected in series or parallel-connected pairs; and
the field coils and the first connection plate are electrically connected together.

17. A DC motor having four or more poles comprising:
a cylindrical commutator composed on an axis of an armature;
brushes composed of positive brushes and negative brushes disposed on an outer periphery of the cylindrical commutator;
brush holders that hold the brushes;
brush pressing members accommodated in the brush holders that press the brushes toward the cylindrical commutator;

an electrically conductive first connection plate to which all the positive brushes or all the negative brushes are electrically connected individually via pigtails; and an electrically conductive second connection plate to which all the negative brushes or all the positive brushes are electrically connected individually via the pigtails; wherein, the brush holder of which an inner circumferential side in a radial direction facing the cylindrical commutator is opened includes a wall on an outer circumferential side in the radial direction thereof that regulates an outside position in the radial direction of the brush pressing member, an armature core side in an axial direction of the brush holder, which is referred to as a core side, is assembled to the first connection plate, and a counter-armature core side in the axial direction of the brush holder, which is referred to as a counter-core-side, is assembled to the second connection plate;

when referring to the brush holder that holds the brush connected to the first connection plate via a pigtail of the pigtails as a first brush holder, and the brush holder that holds the brush connected to the second connection plate via the pigtail as a second brush holder;

a slit that opens outside in the radial direction and extends to a radially middle position is formed in the first connection plate at a circumferential position where the first brush holder is disposed, and a bridge portion that crosses at least a part of the slit in a circumferential direction is disposed on a core side in a thickness direction of the first connection plate to connect both sides of the slit; and the first brush holder has a slit insertion portion on the core side in the axial direction, the first brush holder is assembled to the first connection plate by inserting the slit insertion portion into the slit from an outer circumferential side of the first connection plate via inside the bridge portion, and an outside position in the radial direction of the first brush holder with respect to the first connection plate is regulated by a single first regulating member.

* * * * *